(12) United States Patent
Li Po et al.

(10) Patent No.: US 7,580,413 B2
(45) Date of Patent: Aug. 25, 2009

(54) DYNAMIC ALLOCATION METHOD IN DIGITAL SIGNAL PROCESSORS

(75) Inventors: Dunlop Li Po, Shanghai (CN); Zhigang Luo, Shanghai (CN); Wei Li, Shanghai (CN)

(73) Assignee: ALCATEL, Paris (FR)

( * ) Notice: Subject to any disclaimer, the term of this patent is extended or adjusted under 35 U.S.C. 154(b) by 756 days.

(21) Appl. No.: 10/896,903

(22) Filed: Jul. 23, 2004

(65) Prior Publication Data

US 2005/0025170 A1     Feb. 3, 2005

(30) Foreign Application Priority Data

Jul. 31, 2003    (CN) ............................. 03 1 41971

(51) Int. Cl.
  *H04L 12/28*    (2006.01)
  *H04J 3/16*     (2006.01)

(52) U.S. Cl. ................................... 370/395.4; 370/437
(58) Field of Classification Search ................. 370/465, 370/468, 254, 431, 239–240, 258, 424–425, 370/463, 437, 395.4, 362–363, 442, 447, 370/451; 379/254, 431, 465, 468; 709/203, 709/208, 209, 211, 223, 225; 714/10–13
See application file for complete search history.

(56) References Cited

U.S. PATENT DOCUMENTS

| 6,009,507 A | 12/1999 | Brooks et al. |
| 6,240,086 B1 | 5/2001 | Morgan et al. |
| 6,282,184 B1* | 8/2001 | Lehman et al. ............. 370/342 |
| 2004/0081097 A1* | 4/2004 | Dominique et al. ......... 370/232 |

FOREIGN PATENT DOCUMENTS

| WO | WO 95/26088 A1 | 9/1995 |
| WO | WO 00/27164 A2 | 5/2000 |

OTHER PUBLICATIONS

Efstathiou D et al: "Recent Developments in Enabling Technologies for Software Defined Radio" IEEE Communications Magazine, IEEE Service Center, New York, NY US, vol. 37, No. 8, Aug. 1999, pp. 112-117, XP000835328.

* cited by examiner

*Primary Examiner*—Kwang B Yao
*Assistant Examiner*—Tung Q Tran
(74) *Attorney, Agent, or Firm*—Sughrue Mion, PLLC (57) ABSTRACT

The present invention provides a dynamic allocation method in Digital Signal Processors (DSPs) for processing high and low data rate channels. Said method takes advantage of Software Defined Radio (SDR) library and the different requirements for processing high and low speed channels in radio communications, to combine the processing method of high data rate channels and the processing method of low data rate channels into one DSP cluster. Thus said method can process both high and low data rate channels simultaneously in the same DSP cluster. Said method can maintain the processing throughput of high data rate channels, while reducing latency on low data rate channels, so can improve the processing performance and save the cost.

11 Claims, 7 Drawing Sheets

DYNAMIC ALLOCATION METHOD IN DIGITAL SIGNAL PROCESSORS

CROSS-REFERENCE TO RELATED APPLICATION(S)

This application is based on the Chinese Patent Application No. 03141971.2 filed on Jul. 31, 2003, the disclosure of which is hereby incorporated by reference thereto in its entirety, and the priority of which is hereby claimed under 35 U.S.C. §119.

FIELD OF THE INVENTION

The present invention generally relates to the field of radio communications, and particularly to a dynamic allocation method in Digital Signal Processors (DSPs) for processing high and low speed channels.

BACKGROUND OF THE INVENTION

In the field of radio communications, lower latency is required to process low data rate channels whereas higher latency is required to process high data rate channels. The following methods are among the existing methods for processing both high and low data rate channels.

1) Each DSP in a DSP cluster completes the whole procedure for processing a low data rate channel individually. The drawback of this method is that it cannot process channels above a certain data rate because of the limitation of the processing power of an individual DSP.

2) DSPs in a DSP cluster are connected together and process high data rate channels in a manner of pipeline. The drawback of this method is that the division of function blocks in the whole signal processing function chain is fixed, and the DSP used to implement the corresponding signal processing function block is also fixed. Thus, limited resource is not effectively utilized which leads to a waste of resource.

3) A DSP with high performance is used to process high data rate channels. The drawback of this method is the high cost.

4) High data rate channels are processed in parallel on a DSP cluster. It is very difficult to divide many DSP applications into functions to be processed in parallel. Usually the next function in the process often depends on the result of a previous function in the process. Thus, the two functions cannot be processed in parallel.

In order to solve the problems existed in the prior art, the present invention provides a dynamic allocation method for DSP, which can process high and low speed channels at the same time.

SUMMARY OF THE INVENTION

An object of the present invention is to provide a dynamic allocation method in DSPs for processing high and low speed channels. The method can process simultaneously both high and low speed channels in real time with limited processing resources and without practical detriment to either channel.

The dynamic allocation method in DSPs of the present invention comprises steps of:

a. inputting m channels to be processed into a DSP cluster, and obtaining by a master DSP in said DSP cluster a bit rate of each one of said m channels, wherein m is a positive integer greater than or equal to 1;

b. assigning, by a scheduler of said master DSP, one or more channels of said m channels to at least one slave DSP in said DSP cluster based on said bit rates of said m channels obtained in said step a;

c. downloading, by each slave DSP to which one or more of said m channels have been assigned, from a Software Defined Radio (SDR) library of said DSP cluster, assigned corresponding signal processing function chain, based on assigned channels to be processed, and outputting processing results after said assigned channels have been processed.

Step b further comprises steps of:

b1. comparing said bit rate obtained of each of said m channels with a bit rate of channel which a single slave DSP in the DSP cluster can process;

b2. assigning, by the scheduler of the master DSP, one slave DSP to process said one channel or more than one channels when the bit rate of one of said m channels or the sum of the bit rates of more than one of said m channels is less than or equal to the bit rate of channel which a single slave DSP of the DSP cluster can process;

b3. assigning, by the scheduler of the master DSP, two or more slave DSPs to process said channel when the bit rate of one of said m channels is greater than the bit rate of channel which a single slave DSP in the DSP cluster can process.

In Step b3, when the scheduler of the master DSP assigns two or more slave DSPs, the number of the slave DSPs is determined based on the following formula:

$$n = \text{bit\_rate} * \sum_{i=1}^{k} spb(i),$$

where n indicates the number of DSPs required to process a channel, and the value of n is taken as an integer after being rounded up;

bit_rate indicates the bit rate of channel;

spb(i) indicates the time required by each function in the SDR library of the DSP cluster to process each bit of a signal;

i indicates the index number of function (subscript) in a signal processing function chain;

k indicates the total number of functions in a signal processing function chain.

In Step b3, when the scheduler of the master DSP assigns two or more slave DSPs, the number of the slave DSPs is determined by means of a look up table, which is obtained previously by simulation experiments.

When the scheduler of the master DSP assigns one slave DSP to process one or more channels of said m channels in Step b2, in Step c, said slave DSP downloads the whole signal processing function chain from the SDR library of the DSP cluster to process said one or more channels.

When the scheduler of the master DSP assigns two or more slave DSPs to process one of said m channels in Step b3, in Step c, said two or more slave DSPs download continuous and relatively balanced function subchains of the whole signal processing function chain from the SDR library, and process said channel according to the continuity of each function subchain. That is, after processing one of said m channels, the slave DSP having downloaded the previous function subchain in the whole signal processing function chain transmits the processing results to the slave DSP having downloaded the next function subchain in the whole signal processing function chain to process one of said m channels. This procedure proceeds until said one of said m channels passes through the process of the whole signal processing function chain.

The number of functions in the function subchain downloaded by each of said two or more slave DSPs is determined based on the following formula:

$$\text{bit\_rate} * \sum_{i=j}^{m} spb(i) = 1,$$

where bit_rate indicates the bit rate of channel;
spb(i) indicates the time required by each function in the SDR library of the DSP cluster to process each bit of a signal;
i indicates the index number of function (subscript) in a signal processing function chain;
j,m indicate the beginning and ending index numbers of function assigned to a particular DSP, respectively.

The number of functions in the function subchain downloaded by each of said two or more slave DSPs may be determined by means of a look up table, which is obtained previously by simulation experiments.

According to the present invention, a DSP (Digital Signal Processor) cluster for processing high and low speed channels comprises a group of completely identical DSPs; and a SDR (Software Defined Radio) library with signal processing functions, said group of completely identical DSPs and said SDR library being connected to each other via a common bus, wherein
in said group of completely identical DSPs, one of the DSPs is specified as a master DSP, the others are slave DSPs, and said master DSP comprises a scheduler for obtaining the bit rate of each of inputted m channels to be processed, where m is a positive integer greater than or equal to 1, and said scheduler of said master DSP assigns one or more channels of said m channels to at least one DSP in the DSP cluster based on the obtained bit rate of each of said m channels;
in said slave DSPs, each slave DSP assigned to each of said m channels downloads assigned corresponding signal processing function chain from the SDR library of said DSP cluster according to the assigned channel to be processed respectively, and outputs the processing results after processing each of said assigned m channels;
said SDR library with signal processing functions comprises the whole signal processing function chain which is required to process a channel, and each slave DSP has access to the whole signal processing function chain in said SDR library, and said SDR library resides in a SDRAM (Synchronous Data RAM).

Each DSP in the DSP cluster is connected to each other in any of a star configuration, a ring configuration or the combination of them via a common bus.

The present invention takes advantage of SDR (Software Defined Radio) library and the different requirements for processing high and low speed channels in radio communications, to combine the processing method of high data rate channels and the processing method of low data rate channels into one DSP cluster, thus can process simultaneously both high and low data rate channels in the same DSP cluster. Said method can maintain the processing throughput of high data rate channels while reducing latency on low data rate channels, thus can improve the processing performance and save the cost.

BRIEF DESCRIPTION OF THE DRAWINGS

Other features and advantages of the present invention will appear from the following description of preferred embodiments given by way of non-limiting illustrations, and from the accompanying drawings, in which.

DESCRIPTION OF THE PREFERRED EMBODIMENTS

The present invention will now be further described in combination with the attached drawings and exemplary embodiments of the present invention.

The present invention is realized based on the actual environments in radio communications. That is, generally, low data rate channels are used in the case where the condition of radio channels is not good and fast link adaptation methods are utilized to reduce latency, whereas high data rate channels are used in the case where the condition of radio channels is good and latency is not important.

Figure 1:
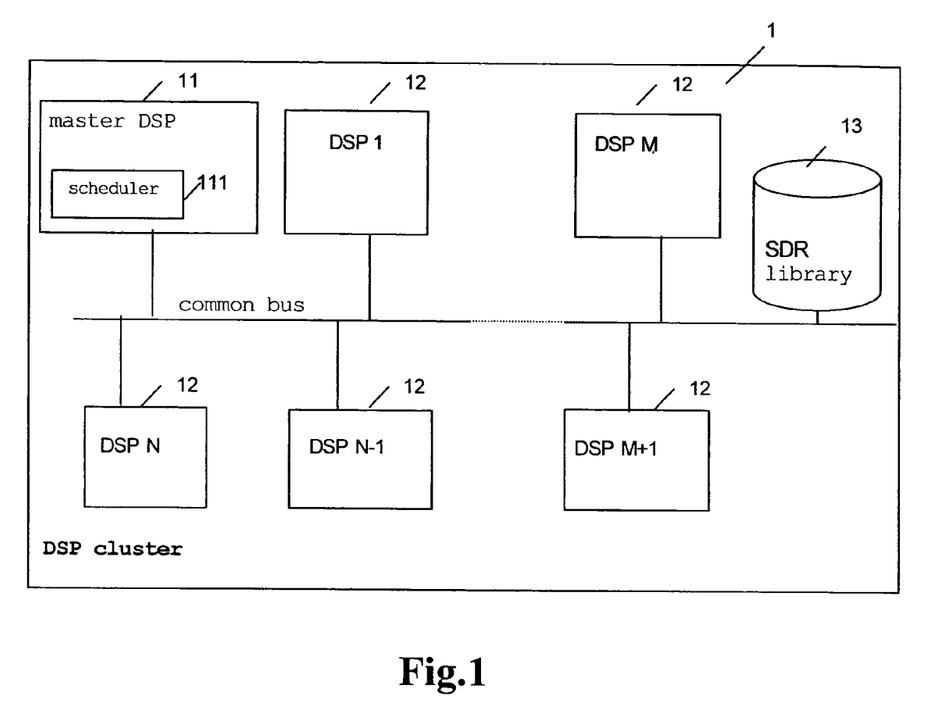
FIG. 1 is a schematic illustrating the basic configuration of a DSP cluster of the present invention.

FIG. 1 illustrates the basic configuration of the DSP cluster of the present invention. As shown in FIG. 1, the DSP cluster 1 for processing high and low speed channels of the present invention comprises a master DSP 11, N slave DSPs 12 which are completely identical, where N is a positive integer greater than or equal to 1, and a SDR (Software Defined Radio) library 13 with signal processing functions. Actually, the master DSP and the slave DSPs are the same in the hardware structure. When the system is initialized, one of the DSPs is specified as a master DSP and corresponding software for performing some functions is loaded into the specified DSP so as to differentiate between the master DSP and the slave DSPs in respect of their functions.

As shown in FIG. 1, the master DSP 11, the N slave DSPs 12 and the SDR library 13 are connected together in a star configuration via a common bus. Besides in a star configuration, the master DSP 11, the N slave DSPs 12 and the SDR library 13 may also be connected together in a ring configuration or the combination of star and ring configurations via a common bus (not shown).

In FIG. 1, the master DSP 11 comprises a scheduler 111 for obtaining the bit rate of each of inputted m channels to be processed, where m is a positive integer greater than or equal to 1. And the scheduler 111 of said master DSP 11 assigns one or more channels of the m channels to at least one slave DSP 12 in the DSP cluster 1 based on the obtained data rate of each of said m channels. Meanwhile, said master DSP 11 also has a scheduling and real time operating system function.

Among the N completely identical DSPs 12, each DSP assigned to each channel downloads the corresponding signal processing function chain from the SDR library 13 of the DSP cluster 1 according to said assigned channel to be processed, and outputs the processing results after processing each assigned channel.

The SDR (Software Defined Radio) library 13 with signal processing functions comprises the whole signal processing function chain which is required to process a channel. Each slave DSP has access to the whole signal processing function chain, wherein signal processing functions include encoding/decoding, rate matching, interleaving and so on. Moreover, the SDR library resides in a SDRAM (Synchronous Data RAM).

Figure 2:
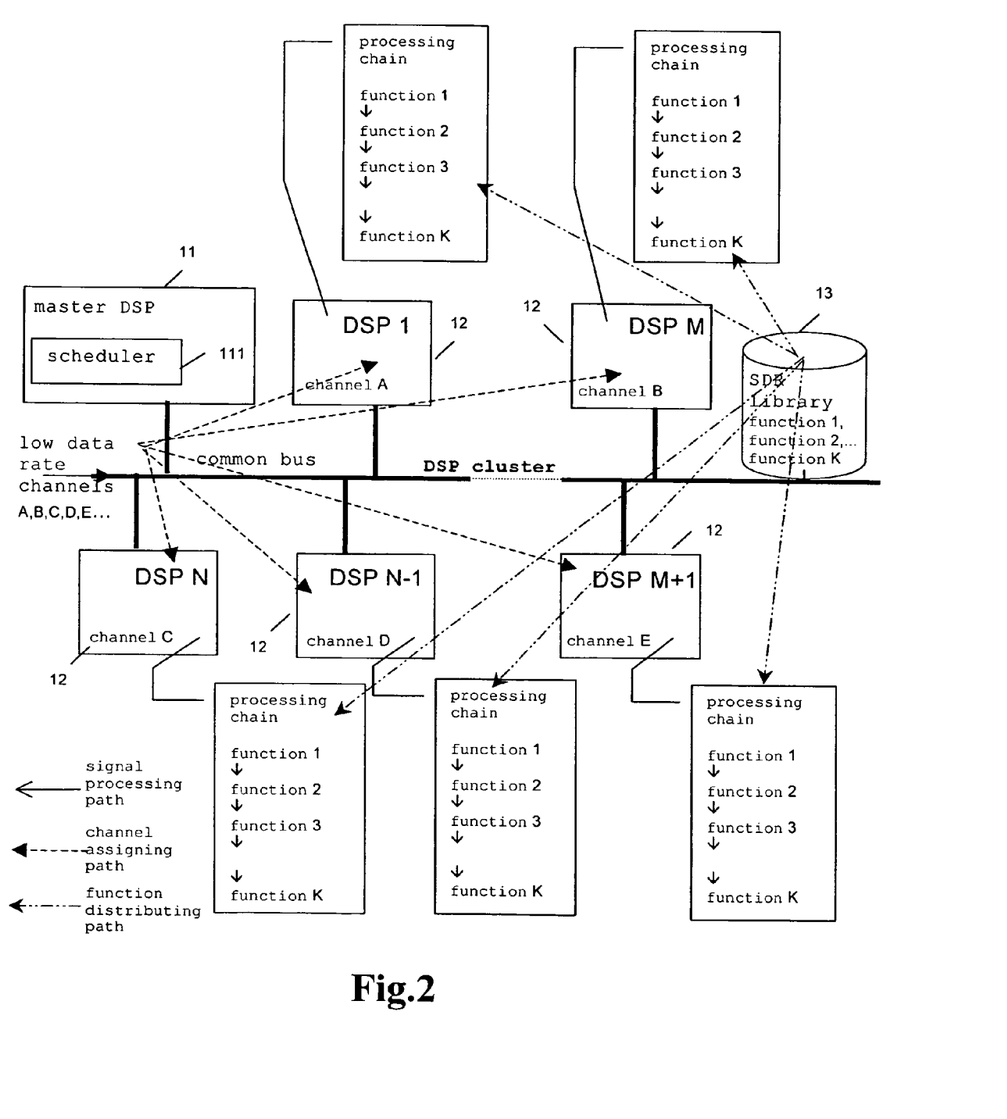
FIG. 2 is a schematic illustrating the process of low data rate channels in the DSP cluster of the present invention.

FIG. 2 illustrates the process of low data rate channels in the DSP cluster of the present invention. As shown in FIG. 2, firstly, low bit rate channels A, B, C, D, E to be processed are inputted into the DSP cluster 1 simultaneously, then the master DSP 11 in the DSP cluster obtains the bit rate of each of low data rate channels A, B, C, D, E.

Secondly, the obtained bit rate of each of low data rate channels A, B, C, D, E is compared with the bit rate of channel which a single slave DSP 12 in the DSP cluster can process. Since the bit rate of each of low data rate channels A, B, C, D and E is less than or equal to the bit rate of channel which a single slave DSP 12 in the DSP cluster can process, the scheduler 111 of the master DSP 11 assigns one slave DSP 12 respectively to process low data rate channels A, B, C, D, E. That is, the scheduler 111 of the master DSP 11 assigns channel A to DSP 1, a channel B to DSP M, channel C to DSP N, channel D to DSP N−1, and channel E to DSP M+1.

Then, DSP 1, DSP M, DSP N, DSP N−1 and DSP M+1 download the whole signal processing function chain including function 1 to function k from the SDR library 13 of the DSP cluster 1 respectively according to assigned low data rate of channels A, B, C, D, E to be processed, and output the processing results in the sequence of the signal processing function chain, i.e., from function 1 to function k, after processing assigned low data rate channels A, B, C, D, and E respectively.

Figure 3:
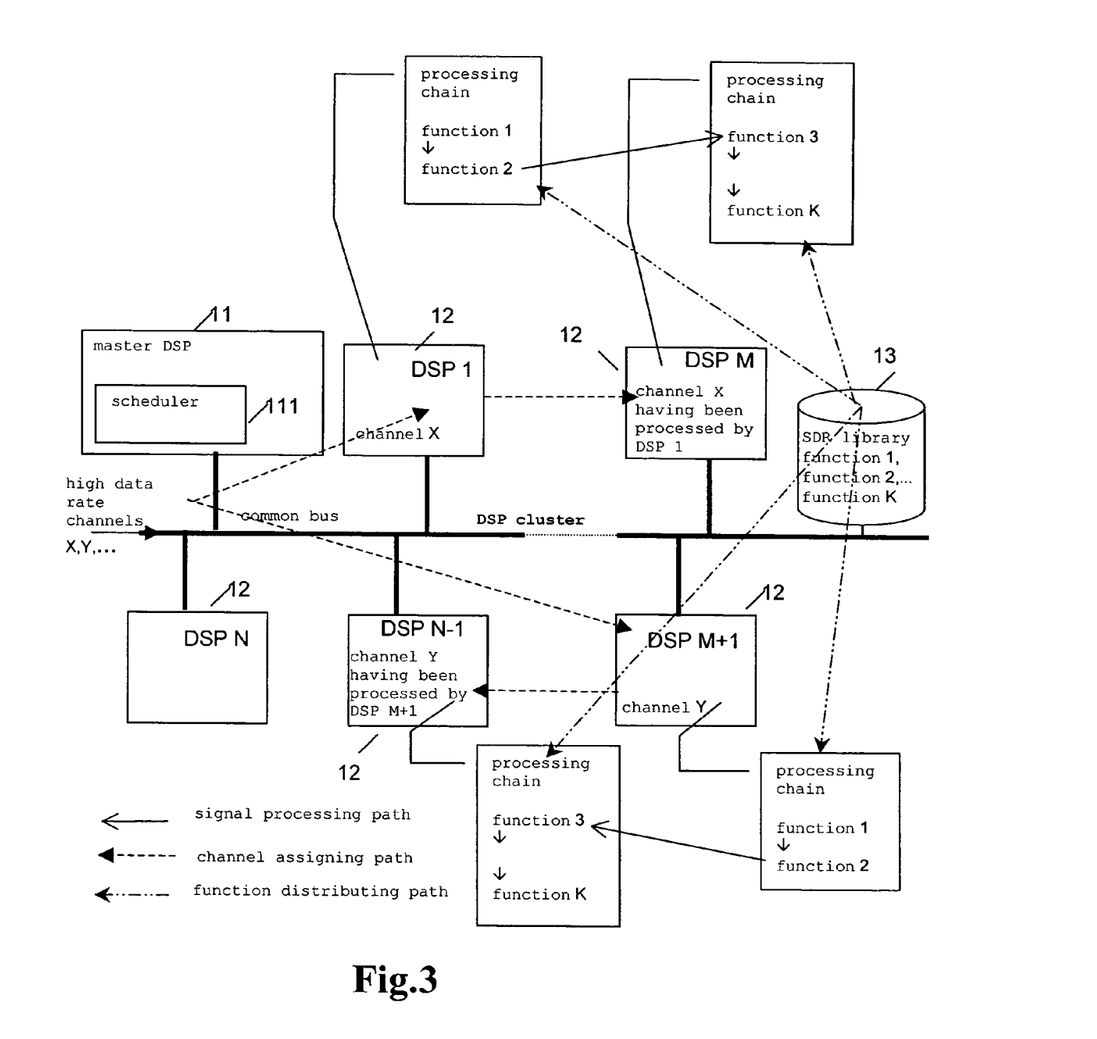
FIG. 3 is a schematic illustrating the process of high data rate channels in the DSP cluster of the present invention.

FIG. 3 illustrates the process of high data rate channels in the DSP cluster of the present invention. As shown in FIG. 3, firstly, high data rate channels X, Y to be processed are inputted into the DSP cluster 1 simultaneously, then the master DSP 11 in the DSP cluster obtains the bit rate of each of high data rate channels X, Y.

Secondly, the obtained bit rate of each of high data rate channels X, Y is compared with the bit rate of channel which a single slave DSP 12 in the DSP cluster can process. Since the bit rate of each of high data rate channels X, Y is greater than the bit rate of channel which a single slave DSP 12 in the DSP cluster can process, which indicates that only one slave DSP 12 is not able to execute the process of either of high data rate channels X, Y. Thus, in order to maintain a certain throughput, the scheduler 111 of the master DSP 11 assigns two slave DSPs 12 to process high data rate channels X, Y, respectively. That is, the scheduler 111 of the master DSP 11 assigns high data rate channel X to DSP 1 and DSP M, and high data rate channel Y to DSP M+1 and DSP N−1.

However, how does the scheduler 111 of the master DSP 11 determine how many slave DSPs 12 are required to process a high data rate channel? The scheduler 111 of the master DSP 11 may determine the number of slave DSPs 12 required to process one high data rate channel based on the following formula:

$$n = \text{bit\_rate} * \sum_{i=1}^{k} spb(i), \quad (1)$$

where n indicates the number of DSPs required to process a channel, and the value of n is taken as an integer after being rounded up;

bit_rate indicates the bit rate of channel;

spb(i) indicates the time required by each function in the SDR library of the DSP cluster to process each bit of a signal;

i indicates the index number of function (subscript) in a signal processing function chain;

k indicates the total number of functions in a signal processing function chain.

The number of slave DSPs 12 required to process one high data rate channel may be determined by means of a look up table, which is obtained previously by simulation experiments.

And later, DSP 1 and DSP M download continuous and relatively balanced function subchains in the whole signal processing function chain including function 1 to function k from the SDR library 13 respectively according to assigned high data rate channel X. That is, DSP 1 downloads function 1and function 2 from the SDR library 13, while DSPM downloads function 3 to function k from the SDR library 13. The number of functions in the function subchain downloaded by each slave DSP 12 may be determined based on the following formula:

$$\text{bit\_rate} * \sum_{i=j}^{m} spb(i) = 1, \quad (2)$$

where bit_rate indicates the bit rate of channel;

spb(i) indicates the time required by each function in the SDR library of DSP cluster to process each bit of a signal;

i indicates the index number of function (subscript) in a signal processing function chain;

j,m indicate the beginning and ending index numbers of function assigned to a particular DSP, respectively.

The number of functions in the function subchain downloaded by each slave DSP 12 may be determined by means of a look up table which is obtained previously by simulation experiments.

After processing high data rate channel X in turn according to function 1 and function 2 downloaded from the SDR library 13, DSP 1 transmits the processing results to the slave DSP 12 having downloaded the next subchain in the whole signal processing function chain, i.e., DSP M, which then processes high data rate channel X in turn according to function 3 to function k and outputs the processing results.

In the same way, DSP M+1 and DSP N−1 download continuous and relatively balanced function subchains in the whole signal processing function chain including function 1 to function k from the SDR library 13 respectively according to assigned high data rate channel Y. That is, DSP M+1 downloads function 1 and function 2 from the SDR library 13, while DSP N−1 downloads function 3 to function k from the SDR library 13.

After processing high data rate channel Y in turn according to function 1 and function 2 downloaded from the SDR library 13, DSP 1 transmits the processing results to the slave DSP 12 having downloaded the next subchain in the whole signal processing function chain, i.e., DSP M, which then processes high data rate channel Y in turn according to function 3 to function k and outputs the processing results.

Figure 4:
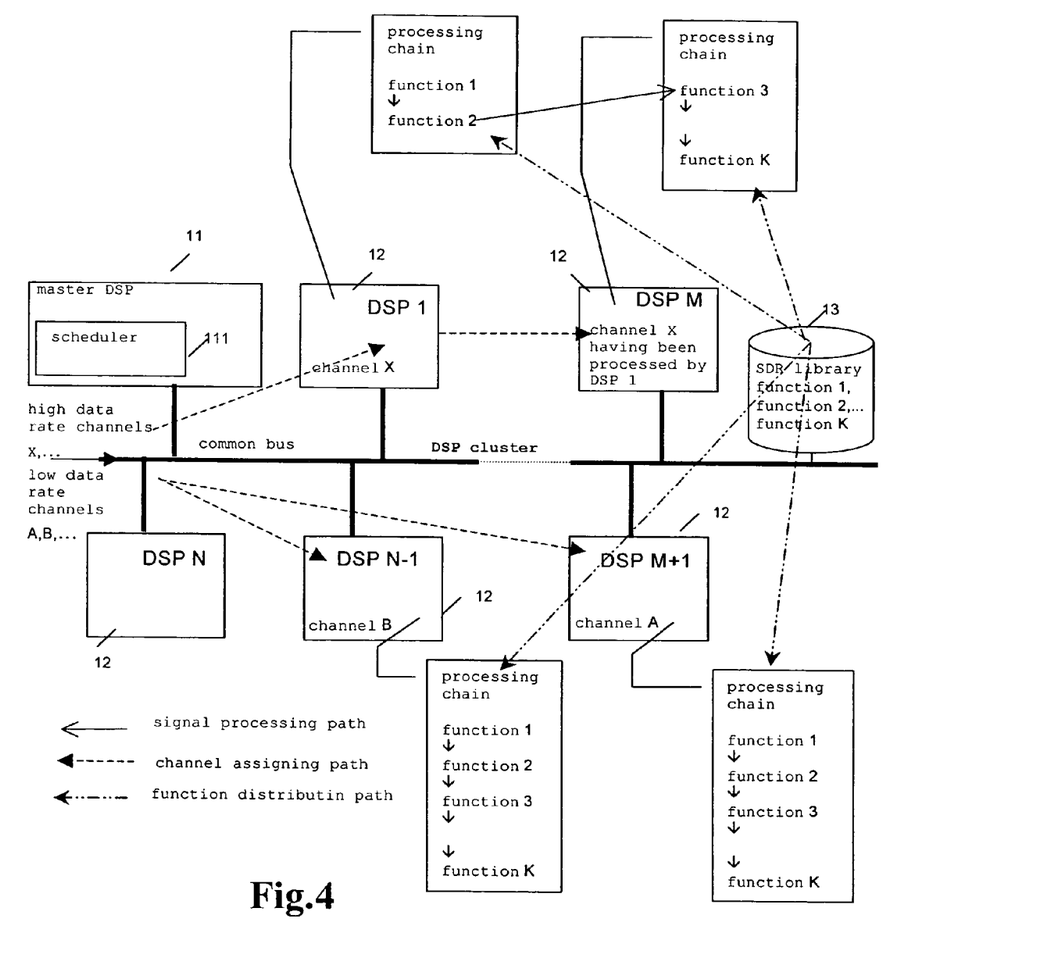
FIG. 4 is a schematic illustrating the parallel process of high and low data rate channels in the DSP cluster of the present invention.

FIG. 4 illustrates the parallel process of high and low data rate channels in the DSP cluster of the present invention. As shown in FIG. 4, firstly, high and low data rate channels, i.e., high data rate channel X and low data rate channels A, B, are inputted into the DSP cluster 1 simultaneously, and the master DSP 11 in the DSP cluster 1 obtains the bit rates of high data rate channel X and low data rate channels A, B.

Secondly, the obtained bit rates of high data rate channel X and low data rate channels A, B are compared with the bit rate of channel which a single slave DSP 12 in the DSP cluster can process, respectively.

Since the bit rates of low data rate channels A, B are less than or equal to the bit rate of channel which a single slave DSP 12 in the DSP cluster can process, the scheduler 111 of the master DSP 11 assigns one slave DSP 12 respectively to process low bit rate channels A, B. That is, the scheduler 111 of the master DSP 11 assigns a channel A to DSP M+1 and a channel B to DSP N−1.

Then, DSP M+1 and DSP N−1 download the whole signal processing function chain including function 1 to function k from the SDR library 13 of the DSP cluster 1 respectively according to assigned low data rate channels A, B to be processed, and output the processing results in the sequence of the signal processing function chain, i.e., from function 1 to function k, after processing assigned low data rate channels A, B respectively.

At the same time, since the bit rate of high data rate channel X is greater than the bit rate of channel which a single slave DSP 12 in the DSP cluster can process, which indicates only one slave DSP 12 is not able to execute the process of high data rate channel X. Thus, in order to maintain a certain throughput, the scheduler 111 of the master DSP 11 determines to assign two slave DSPs 12 to process high data rate channel X based on the formula (1). That is, the scheduler 111 of the master DSP 11 assigns high data rate channel X to DSP1 and DSPM.

The number of slave DSPs 12 required to process one high data rate channel may be determined by means of a look up table which is obtained previously by simulation experiments.

And later, DSP 1 and DSP M download continuous and relatively balanced function subchains in the whole signal processing function chain including function 1 to function k from the SDR library 13 according to assigned high data rate channel X based on the formula (2). That is, DSP 1 downloads function 1 and function 2 from the SDR library 13, while DSP M downloads function 3 to function k from the SDR library 13.

The number of functions in the function subchain downloaded by each slave DSP 12 may be determined by means of a look up table which is obtained previously by simulation experiments.

After processing high data rate channel X in turn according to function 1 and function 2 downloaded from the SDR library 13, DSP 1 transmits the processing results to the slave DSP 12 having downloaded the next subchain in the whole signal processing function chain, i.e., DSP M, which then processes high data rate channel X in turn according to function 3 to function k and outputs the processing results.

To sum up, the dynamic allocation method in DSPs comprises steps of:

a. inputting m channels to be processed into a DSP cluster, and obtaining by a master DSP in said DSP cluster obtains a bit rate of each one of said m channels, wherein m is a positive integer greater than or equal to 1;

b. assigning, by a scheduler of said master DSP, one or more channels of said m channels to at least one slave DSP in said DSP cluster based on said bit rates of said m channels obtained in said step a;

c. downloading, by each slave DSP to which one or more of said m channels have been assigned, from a Software Defined Radio (SDR) library of said DSP cluster, assigned corresponding signal processing function chain, based on assigned channels to be processed, and outputting processing results after said assigned channels have been processed.

Step b further comprises steps of:

b1. comparing said bit rate obtained of each of said m channels with a bit rate of channel which a single slave DSP in the DSP cluster can process;

b2. assigning, by the scheduler of the master DSP, one slave DSP to process said one channel or more than one channels when the bit rate of one of said m channels or the sum of the bit rates of more than one of said m channels is less than or equal to the bit rate of channel which a single slave DSP of the DSP cluster can process;

b3. assigning, by the scheduler of the master DSP, two or more slave DSPs to process said channel when the bit rate of one of said m channels is greater than the bit rate of channel which a single slave DSP in the DSP cluster can process.

In Step b3, when the scheduler of the master DSP assigns two or more slave DSPs, the number of slave DSPs is determined based on the following formula:

$$n = \text{bit\_rate} * \sum_{i=1}^{k} spb(i), \quad (3)$$

where n indicates the number of DSPs required to process a channel, the value of n is taken as an integer after being rounded up;

bit_rate indicates the bit rate of channel;

spb(i) indicates the time required by each function in the SDR library of the DSP cluster to process each bit of a signal;

i indicates the index number of function (subscript) in a signal processing function chain;

k indicates the total number of functions in a signal processing function chain

In Step b3, when the scheduler of the master DSP assigns two or more slave DSPs, the number of the slave DSPs is determined by means of a look up table, which is obtained previously by simulation experiments.

When the scheduler of the master DSP assigns one slave DSP to process one or more channels of said m channels in Step b2, in Step c, said slave DSP downloads the whole signal processing function chain from the SDR library of the DSP cluster to process said one or more channels.

When the scheduler of the master DSP assigns two or more slave DSPs to process one of said m channels in Step b3, in Step c, said two or more slave DSPs download continuous and relatively balanced function subchains in the whole signal processing function chain from the SDR library of the DSP cluster, and process said channel according to the continuity of each function subchain. That is, after processing one of said m channels, the slave DSP having downloaded the previous function subchain in the whole signal processing function chain transmits the processing results to the slave DSP having downloaded the next function subchain in the whole signal processing function chain to process one of said m channels. This procedure proceeds until one of said m channels passes through the process of the whole signal processing function chain.

The number of functions in the function sub-chain downloaded by each of said two or more slave DSPs may be determined based on the following formula:

$$\text{bit\_rate} * \sum_{i=j}^{m} spb(i) = 1, \quad (4)$$

where bit_rate indicates the bit rate of channel;
spb(i) indicates the time required by each function in the SDR library of the DSP cluster to process each bit of a signal;
i indicates the index number of function (subscript) in a signal processing function chain;
j,m indicate the beginning and ending index numbers of function assigned to a particular DSP respectively.

The number of functions in the function subchain downloaded by each of said two or more slave DSPs may be determined by means of a look up table, which is obtained previously by simulation experiments.

Figure 5:
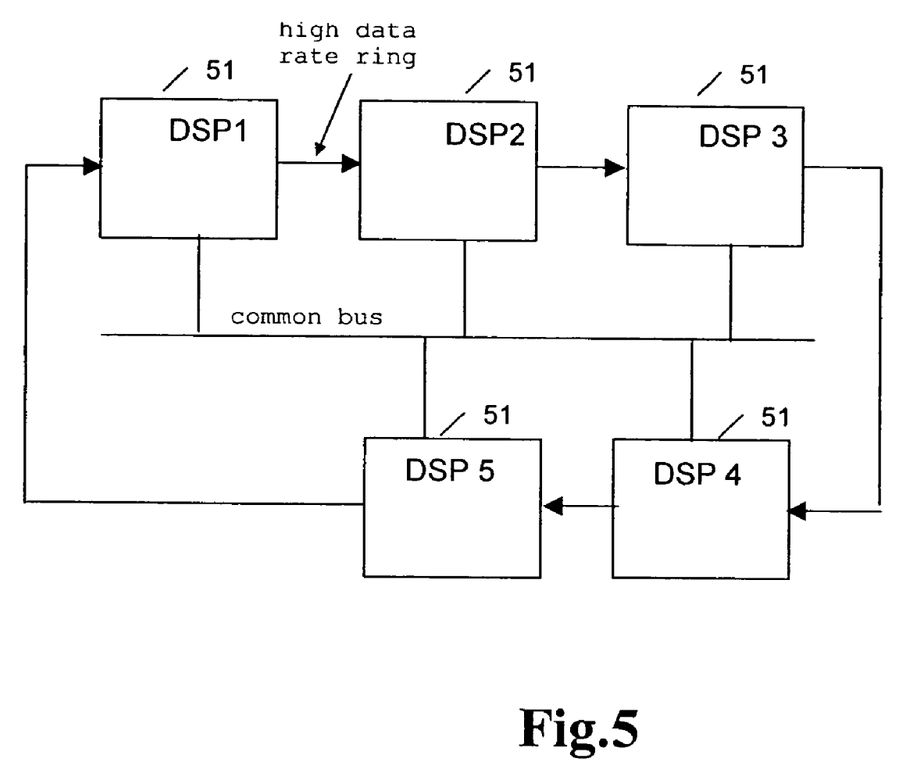
FIG. 5 is a schematic illustrating the configuration of a DDD (Downlink Decoding and De-spreading) DSP cluster according to one embodiment of the present invention.

FIG. 5 illustrates the configuration of a DDD (Downlink Decoding and De-spreading) DSP cluster according to one embodiment of the present invention. The embodiment of the present invention is applied to process HS-DSCH (High Speed Downlink Shared Channels) signals of HSDPA (High Speed Downlink Packet Access) on the current Evolium Node B V2 Base Band Processing Board for UMTS (Universal Mobile Telecommunication Systems). As shown in FIG. 5, the DDD (Downlink Decoding and De-spreading) DSP cluster comprises a master DSP (not shown), 5 completely identical slave DSPs 51 and a SDR (Software Defined Radio) library with signal processing functions (not shown). Said master DSP (not shown), 5 completely identical slave DSPs 51 and SDR library (not shown) are connected to each other in the combination of star and ring configurations via a common bus.

In FIG. 5, each slave DSP 51 can process a 3 Mbit/s channel in downlink with constant throughput.

However, in 3GPP Release 5, HSDPA (High Speed Downlink Packet Access) is usually specified to support HS-DSCH (High Speed Downlink Shared Channels) corresponding to the channel at 14.4 Mbit/s.

The entire HS-DSCH can be used by one mobile station or shared amongst many mobile stations. Depending on channel conditions and the number of mobile stations in a cell etc., the data rate of a single mobile station may range from 0 Mbit/s to 14.4 Mbit/s or the sum of the bit rates of many mobile stations is lower than 14.4 Mbit/s.

To suppose, there are 4 channels respectively at the following bit rates: 2 Mbit/s, 3 Mbit/s, 1 Mbit/s and 6 Mbit/s. Since each slave DSP 51 shown in FIG. 5 is capable to process a 3 Mbit/s channel in downlink with constant throughput, the scheduler of the master DSP (not shown) assigns the channels of which the sum of the data rates is less than or equal to 3 Mbit/s to one DSP, and assigns the channel with a data rate greater than 3 Mbit/s to two or more DSPs based on the formula (1). That is, as shown in FIG. 5, the scheduler of the master DSP assigns the channels at 1 Mbit/s and 2 Mbit/s to DSP 1, the channel at 3 Mbit/s to DSP 2 and the channel at 6 Mbit/s to DSP 4 and DSP 5. DSP 1, DSP 2 download the whole signal processing function chain from the SDR library (not shown) according to the assigned channels respectively, and output the processing results after processing the assigned channels. The signal processing function chain in the SDR library (not shown) is shown as FIG. 6.

Figure 6:
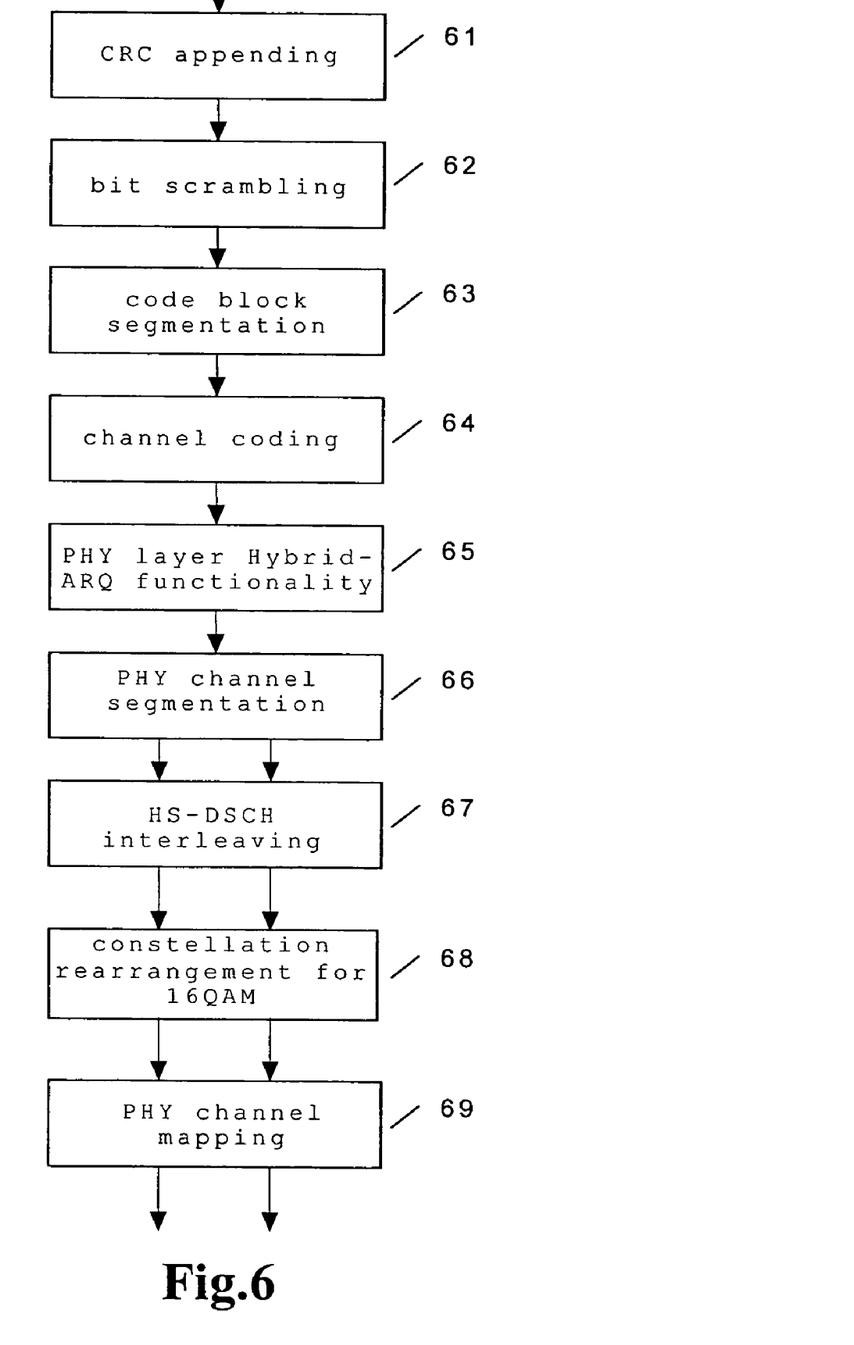
FIG. 6 is a schematic illustrating the signal processing function chain for processing the HS-DSCH (High Speed Downlink Shared Channels) according to one embodiment of the present invention.

FIG. 6 illustrates the signal processing function chain for processing the HS-DSCH (High Speed Downlink Shared Channels) according to the embodiment of the present invention. Said signal processing function chain is included in the SDR library of FIG. 5 (not shown). Each slave DSP 51 has access to said signal processing function chain of the SDR library (not shown), which is shown in FIG. 6. As shown in FIG. 6, said signal processing function chain for processing HS-DSCH (High Speed Downlink Channels) signals according to the embodiment of the present invention comprises Cyclic Redundancy Check (CRC) appending 61, bit scrambling 62, code block segmentation 63, channel coding 64, PHY layer HARQ (Hybrid-ARQ) functionality 65, PHY channel segmentation 66, HS-DSCH signals interleaving 67, constellation rearrangement for 16QAM 68, PHY channel mapping 69 in turn.

DSP 1 processes the channels at 1 Mbit/s and 2 Mbit/s according to the signal processing function chain shown in FIG. 6 and then outputs the processing results. DSP 2 processes the channel at 3 Mbit/s according to the signal processing function chain shown in FIG. 6 and then outputs the processing results.

Based on said formula (2), DSP 4 and DSP 5 download continuous and relatively balanced function subchains in the whole signal processing function chain from said SDR library (not shown), process the assigned channels and then output the processing results. That is, DSP 4 downloads CRC appending 61, bit scrambling 62, code block segmentation 63, channel coding 64, PHY layer HARQ functionality 65, which are shown in FIG. 6, from said SDR library (not shown). After processing the channel at 6 Mbit/s in turn according to the above 5 functions, DSP 4 transmits the processing results to DSP 5 along high speed ring with ring configuration so as to avoid overloading the common bus. Moreover, DSP 5 downloads PHY channel segmentation 66, HS-DSCH signals interleaving 67, constellation rearrangement for 16QAM 68, PHY channel mapping 69, which are shown in FIG. 6, from said SDR library (not shown). After processing the processing results from DSP 4 in turn according to the above 4 functions, DSP 5 outputs the processing results.

Figure 7:
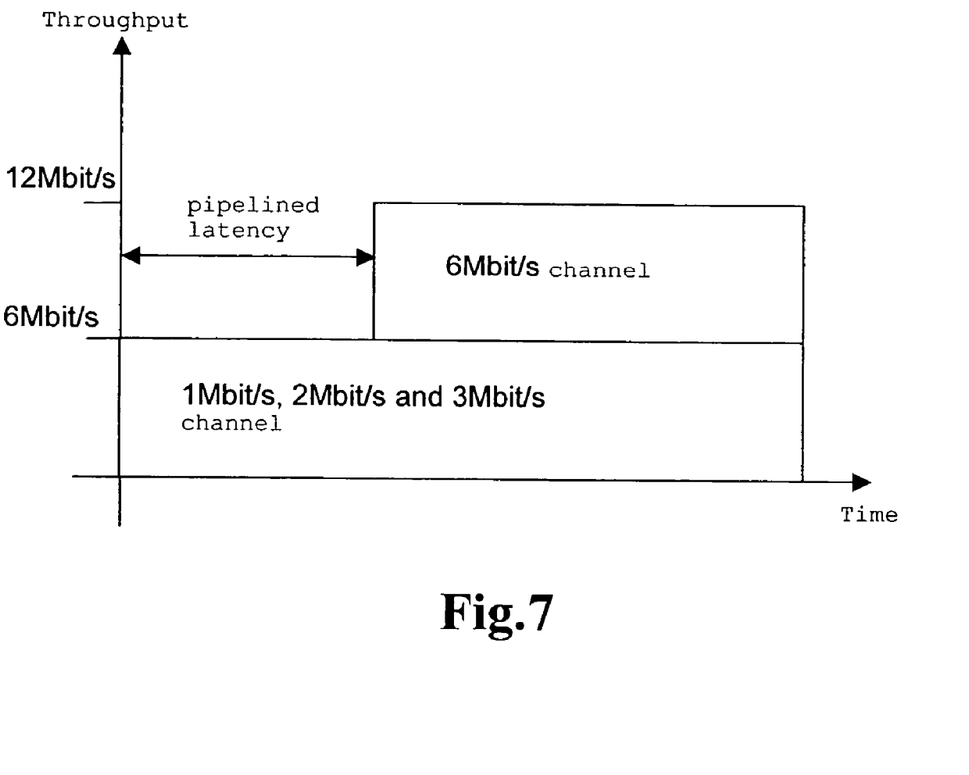
FIG. 7 is the curve chart of pipelined latency according to one embodiment of the present invention.

FIG. 7 illustrates the curve chart of pipelined latency according to the embodiment of the present invention. As shown in FIG. 7, there will be a certain latency on the channel at 6 Mbit/s, however, the throughput will be maintained after the latency, i.e., (output bits)/(processing time)<=(required output data rate).

As many apparently widely different embodiments of the present invention can be made without departing from the spirit and scope thereof, it is to be understood that the invention is not limited to the specific embodiments thereof except as defined in the appended claims.

What is claimed is:

1. A dynamic allocation method in Digital Signal Processors (DSPs) for processing high and low data rate channels, comprising:
inputting m channels to be processed into a DSP cluster, and obtaining by a master DSP in said DSP cluster a bit rate of each one of said m channels, wherein m is a positive integer greater than or equal to 1;

assigning, by a scheduler of said master DSP, one or more channels of said m channels to at least one slave DSP in said DSP cluster based on the obtained bit rate of each of said m channels;

downloading, by each slave DSP to which one or more of said m channels have been assigned, from a Software Defined Radio (SDR) library of said DSP cluster, assigned corresponding signal processing function chain, based on assigned channels to be processed, and outputting processing results after said assigned channels have been processed, wherein said assigning, by a scheduler of said master DSP, one or more channels of said m channels to at least one slave DSP in said DSP cluster comprises:

comparing said bit rate of each of said m channels with a bit rate of channel of a single slave DSP in the DSP cluster.

2. The dynamic allocation method in Digital Signal Processors according to claim 1, wherein said assigning, by a scheduler of said master DSP, one or more channels of said m channels to at least one slave DSP in said DSP cluster comprises:

assigning, by the scheduler of the master DSP, one slave DSP to process said one channel or more than one channels when the bit rate of one of said m channels or the sum of the bit rates of more than one of said m channels is less than or equal to the bit rate of channel which a single slave DSP of the DSP cluster can process;

assigning, by the scheduler of the master DSP, two or more slave DSPs to process said channel when the bit rate of one of said m channels is greater than the bit rate of channel which a single slave DSP in the DSP cluster can process.

3. The dynamic allocation method in Digital Signal Processors according to claim 2, wherein when the scheduler of the master DSP assigns two or more slave DSPs to process said channel, the number of the slave DSPs is determined based on the following formula:

$$n = \text{bit\_rate} * \sum_{i=1}^{k} spb(i)$$

where n indicates the number of DSPs required to process a channel, and the value of n is taken as an integer after being rounded up;

bit_rate indicates the bit rate of channel;

spb(i) indicates the time required by each function in the SDR library of the DSP cluster to process each bit of a signal;

i indicates the index number of function (subscript) in a signal processing function chain;

k indicates the total number of functions in a signal processing function chain.

4. The dynamic allocation method in Digital Signal Processors according to claim 2, wherein when the scheduler of the master DSP assigns two or more slave DSPs to process said channel, the number of the slave DSPs is determined by means of a look up table, which is obtained previously by simulation experiments.

5. The dynamic allocation method in Digital Signal Processors according to claim 2, wherein when the scheduler of the master DSP assigns one slave DSP to process one or more of said m channels, said slave DSP downloads the whole signal processing function chain from the SDR library of the DSP cluster to process said one or more channels.

6. The dynamic allocation method in Digital Signal Processors according to claim 2, wherein when said scheduler of said master DSP assigns two or more slave DSPs to process one of said m channels, said two or more slave DSPs download continuous and relatively balanced function subchains in the whole signal processing function chain from the SDR library of said DSP cluster, and process said channel according to the continuity of each function subchain, that is, after processing said one of said m channels, said slave DSP having downloaded the previous function subchain in the whole signal processing function chain transmits the processing results to the slave DSP having downloaded the next function subchain in the whole signal processing function chain to process said one of said m channels, and this procedure proceeds until said one of said m channels passes through the process of the whole signal processing function chain.

7. The dynamic allocation method in Digital Signal Processors according to claim 5, wherein the number of functions in the function subchain downloaded by each of said two or more slave DSPs may be determined based on the following formula:

$$\text{bit\_rate} * \sum_{i=j}^{m} spb(i) = 1$$

where n indicates the number of DSPs required to process a channel, and the value of n is taken as an integer after being rounded up;

bit_rate indicates the bit rate of channel;

spb(i) indicates the time required by each function in the SDR library of the DSP cluster to process each bit of a signal;

i indicates the index number of function (subscript) in a signal processing function chain;

j,m indicate the beginning and ending index numbers of function allocated to a particular DSP respectively.

8. The dynamic allocation method in Digital Signal Processors according to claim 5, wherein the number of functions in the function subchain downloaded by each of said two or more slave DSPs is determined by means of a look up table, which is obtained previously by simulation experiments.

9. A Digital Signal Processor (DSP) cluster for processing high and low data rate channels, comprising a group of completely identical DSPs and a SDR (Software Defined Radio) library with signal processing functions, said group of completely identical DSPs and said SDR library being connected to each other via a common bus, wherein:

in said group of completely identical DSPs, one of the DSPs is specified as a master DSP and the others are slave DSPs, said master DSP comprises a scheduler for obtaining the bit rate of each of m channels input to be processed, where m is a positive integer greater than or equal to 1, and said scheduler of said master DSP assigns one or more channels of said m channels to at least one slave DSP in the DSP cluster based on the obtained bit rate of each of said m channels;

in said slave DSPs, each slave DSP assigned to each of said m channels downloads assigned corresponding signal processing function chain from the SDR library of said DSP cluster according to the assigned channel to be processed, and outputs the processing results after processing each of said assigned m channels;

said SDR library with signal processing functions comprises the whole signal processing function chain which is required to process one channel, and each slave DSP has access to said whole signal processing function chain in said SDR library, wherein said bit rate of each of said m channels are compared with a bit rate of channel of a single slave DSP in the DSP cluster.

10. The DSP cluster according to claim 5, wherein each DSP in said DSP cluster is connected to each other in a star configuration, a ring configuration or the combination of star and ring configurations via a common bus.

11. The DSP cluster according to claim 5, wherein said SDR library resides in a SDRAM (Synchronous Data RAM).

* * * * *